(12) United States Patent
Kei

(10) Patent No.: US 7,349,152 B2
(45) Date of Patent: Mar. 25, 2008

(54) THREE-DIMENSIONAL CONFOCAL MICROSCOPE SYSTEM

(75) Inventor: Takayuki Kei, Musashino (JP)

(73) Assignee: Yokogawa Electric Corporation, Musahino-shi (JP)

( * ) Notice: Subject to any disclaimer, the term of this patent is extended or adjusted under 35 U.S.C. 154(b) by 172 days.

(21) Appl. No.: 10/916,411

(22) Filed: Aug. 12, 2004

(65) Prior Publication Data

US 2005/0213204 A1    Sep. 29, 2005

(30) Foreign Application Priority Data

Mar. 26, 2004   (JP)   .............................. 2004-090909

(51) Int. Cl.
*G02B 21/00*   (2006.01)
(52) U.S. Cl. ........................ 359/383; 359/368; 359/900
(58) Field of Classification Search ................ 359/383, 359/470
See application file for complete search history.

(56) References Cited

U.S. PATENT DOCUMENTS

| | | | | |
|---|---|---|---|---|
| 5,034,613 A | * | 7/1991 | Denk et al. ............... | 250/458.1 |
| 6,300,618 B1 | * | 10/2001 | Tanaami et al. ............ | 250/216 |
| 6,366,357 B1 | * | 4/2002 | Svetkoff et al. ............ | 356/602 |
| 6,567,585 B2 | * | 5/2003 | Harris ......................... | 385/33 |
| 6,963,067 B2 | * | 11/2005 | Takeuchi et al. ............ | 250/310 |
| 2002/0097490 A1 | * | 7/2002 | Endo et al. .................. | 359/388 |
| 2004/0224315 A1 | * | 11/2004 | Villa et al. ..................... | 435/6 |
| 2005/0211872 A1 | * | 9/2005 | Kawano et al. ........... | 250/201.3 |

FOREIGN PATENT DOCUMENTS

JP        2002-72102         3/2002
WO     WO 0188593 A1  *  11/2001

* cited by examiner

*Primary Examiner*—Stephone B. Allen
*Assistant Examiner*—Lee Fineman
(74) *Attorney, Agent, or Firm*—Westerman, Hattori, Daniels & Adrian, LLP.

(57) ABSTRACT

This invention is characterized by the following feature. A three-dimensional confocal microscope system for performing image processing based on image pickup data of sliced images of a sample outputted from a confocal scanner and thus acquiring a three-dimensional image of the sample, the system comprising a correction unit for correcting brightness of the sliced images on the basis of depth of the sample. Thus, a three-dimensional confocal microscope system that corrects changes in the brightness of the image due to the depth of the sample and thus achieves uniform brightness of the image at any point in the direction of depth can be realized.

2 Claims, 7 Drawing Sheets

← Sectional position

Example of sliced image

Sectional brightness distribution of image

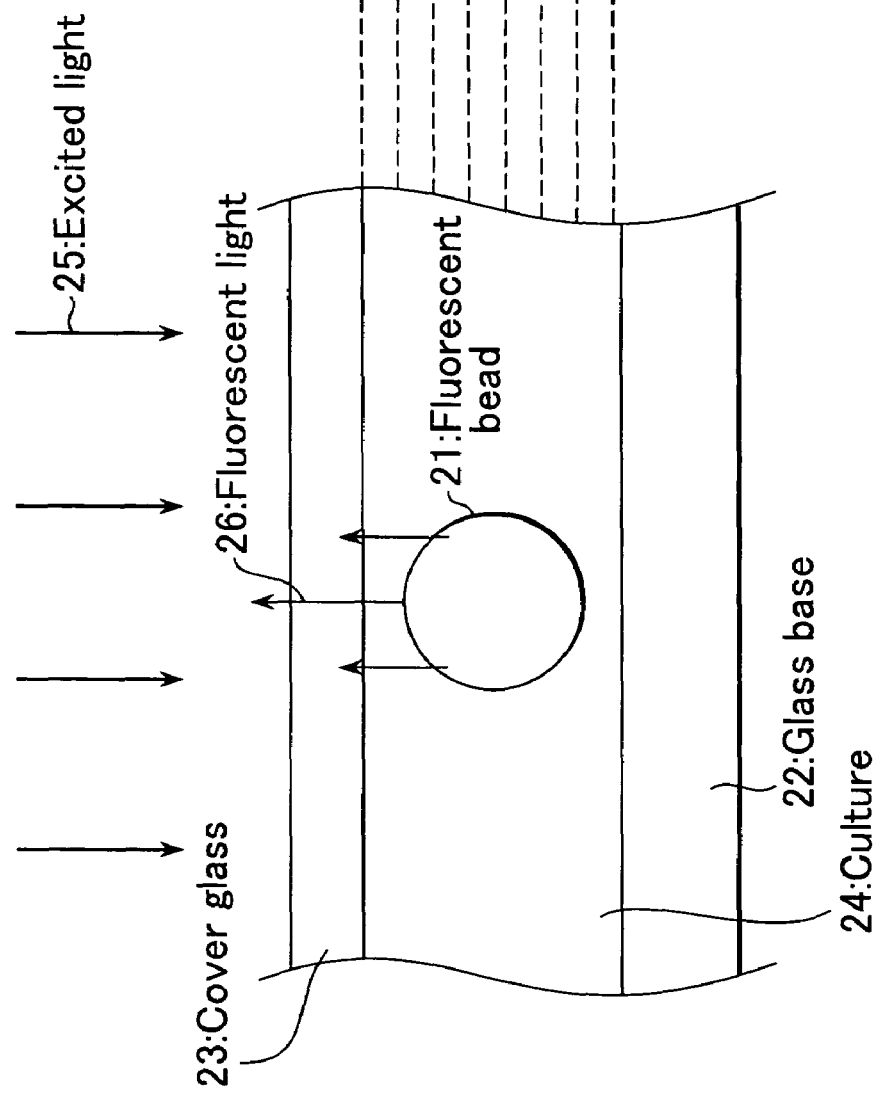

THREE-DIMENSIONAL CONFOCAL MICROSCOPE SYSTEM

BACKGROUND OF THE INVENTION

1. Field of the Invention

This invention relates to a three-dimensional confocal microscope system and particularly to improvements made to correct brightness of a confocal image in the direction of depth of a sample and carry out three-dimensional observation of the sample with accurate brightness.

2. Description of the Related Art

With a confocal microscope, it is possible to acquire sliced images of a sample without thinly segmenting the sample and to construct a precise three-dimensional image of the sample from the sliced images. Therefore, the confocal microscope is used for observation of physiological reactions and morphological observation of live cells in the field of biology and biotechnology, or for surface observation of LSI devices in the semiconductor market (see, for example, Patent Reference 1).

Patent Reference 1: JP-A-2002-72102

FIG. 1 is a structural view of a confocal microscope described in Patent Reference 1. A video camera 1, a confocal scanner 2, a microscope 3, an actuator 4 and an objective lens 5 are arranged on the same optical axis. The confocal scanner 2 has a Nipkow disk having multiple pinholes and a microlens array associated with the disk. The confocal scanner is of a compact add-on type formed by a simple optical system and employing the Nipkow disk method.

This confocal scanner 2 is attached to a camera port of the microscope 3. Using laser beams, the confocal microscope inputs an image of a sample to the confocal scanner 2 via the objective lens 5, the actuator 4 and the microscope 3. The confocal scanner 2 acquires a confocal image of the sample and inputs it to the video camera 1.

FIG. 2 is a timing chart of various signals handled by the confocal microscope shown in FIG. 1. The video camera 1 converts the confocal image to a video signal 101 and inputs the video signal 101 to signal input terminals of the confocal scanner 2 and a synchronization interface box 9 and to a video input terminal of an image processing unit 6. The confocal scanner 2 performs rotational synchronization control of the Nipkow disk in synchronization with the video signal 101.

The synchronization interface box 9 extracts either an even-numbered pulse train or an odd-numbered pulse train of the video signal 101 to produce an internal signal A. An arbitrary waveform generator 7 generates a trigger signal 102, which is a high-level pulse signal, and then inputs the trigger signal to a trigger input terminal of the synchronization interface box 9 so that the trigger signal is used for the timing to start scanning the focal plane in question.

The synchronization interface box 9 produces an internal signal B in synchronization with the falling edge of the trigger signal 102. The internal signal B has a high-level pulse width time of approximately 35 microseconds, which is slightly longer than the time defined by the video rate of the video camera 1. The synchronization interface box 9 generates a start signal 103 by calculating the logical product of the internal signal A and the internal signal B, and inputs the start signal 103 to synchronization input terminals of the image processing unit 6 and the arbitrary waveform generator 7.

The image processing unit 6 starts capture in which the video signal 101 is converted to image data and recorded, in synchronization with the rising edge of the start signal 103 inputted from the synchronization input terminal. In accordance with the video signal 101 from the signal input terminal, the synchronization interface box 9 synchronizes all of the rotational synchronization control of the Nipkow disk by the confocal scanner 2, the timing for the image processing unit 6 to start acquiring the video signal, and the timing for an optical control system to start scanning the focal position of the objective lens.

The arbitrary waveform generator 7 starts scanning the focal position of the objective lens 5 by the optical control system in synchronization with the rising edge of the start signal 103. The arbitrary waveform generator 7 generates a scanning signal 104 and inputs it to a controller 8. The scanning signal 104 is a sawtooth signal that linearly rises from a low level to a high level over a specific period of time. The controller 8 inputs the scanning signal 104 to the actuator 4. An actuator signal 105 is a positional signal of the actual actuator. The actuator fully extends and then returns to the original position at a dash, followed by an overshoot. The period of the overshoot corresponds to a dead band.

The actuator 4 is installed between an objective lens revolver and the objective lens 5 of the microscope 3. The length of the actuator 4 in the direction of focal point of an image changes by piezoelectric driving in proportion to the level of the scanning signal 104, and thus controls the focal position of the objective lens 5. The confocal microscope acquires sliced images of the sample by scanning the focal plane in accordance with the scanning signal 104.

According to the structure described above, the rotational synchronization control of the Nipkow disk, the timing for the image processing unit to start acquiring the video signal, and the timing for the optical control system to start scanning the focal position of the lens are all synchronized with the video signal. Therefore, the positional accuracy of the confocal image is improved, thus eliminating variations in the time taken for acquiring each sliced image when acquiring multiple sliced images, and providing highly reliable sliced images.

In the case where an object is observed by using the above-described three-dimensional confocal microscope system, a phenomenon of non-uniform brightness of an image resulting from image pickup occurs even if the object has uniform brightness. One cause of such a phenomenon is shading. Shading is a phenomenon that even when an object with uniform brightness is observed, the central part of its image is bright while the peripheral part is dark because of a large quantity of light at the central part of the image and a small quantity of light at the peripheral part due to the characteristics of image pickup optical systems including a video camera.

FIGS. 3A and 3B are explanatory views for explaining the shading.

FIG. 3A shows an example of sliced image picked up by the confocal microscope.

As shown in FIG. 3A, even if an object has uniform brightness, a result of image pickup shows non-uniform distribution of brightness between the central part and the peripheral part as. FIG. 3B shows distribution of brightness of an image at a position (sectional position) indicated by a solid line in FIG. 3A. The vertical axis represents the brightness of the image and the horizontal axis represents the height of the image (distance from the center of screen). A position where the height of image is 0 (part where a chain-dotted line and a solid line intersect each other in FIG. 3A) is the central part of the sliced image. The brightness of the image is attenuated as it is away from this central part.

Usually, shading correction processing is performed in order to solve the problem caused by such shading.

FIGS. 4A to 4C are explanatory views for explaining the shading correction processing.

As shown in FIGS. 4A to 4C, shading correction is to find brightness distribution (function of height of image and brightness) of an image shown in FIG. 4A picked up in advance from a sample having uniform brightness and a correction function shown in FIG. 4B, which is the reciprocal of the brightness distribution of FIG. 4A, and to multiply the correction function by the brightness of an image acquired by observing an actual observation target. Thus, the distribution of brightness becomes uniform with respect to any height of image, as shown in FIG. 4C.

However, in the conventional three-dimensional confocal microscope system, when an image of an object with uniform brightness is picked up, non-uniformity in brightness may be caused not only by the above-described shading but also by another factor. The confocal microscope is a fluorescent microscope that casts a laser beam (excited light) of a predetermined wavelength onto a sample to be observed and observes the sample by using its fluorescent wavelength. Therefore, if the sample has a certain depth (distance in the direction of optical axis) when the sample is observed by using this fluorescent microscope, the intensity of the excited light is reduced when the excited light reaches the deep part. This causes the brightness of the excited fluorescent light to be lower at the deep part than on the surface of the sample. Moreover, the fluorescent light emitted from the deep part of the sample is reduced in brightness when it reaches the surface.

In this manner, when a sample having a certain depth is observed, the brightness of fluorescent light at the deep part becomes lower than its original brightness. Even with a sample having uniform brightness, its depth causes difference in brightness of an observed fluorescent image and makes it difficult to identify the sample, which is a disadvantage.

The conventional shading correction is performed totally on a flat surface and there has been no measure to correct the brightness of an image in the direction of depth of a sample.

SUMMARY OF THE INVENTION

It is an object of this invention to solve the foregoing problems of the conventional confocal microscope system and to realize a three-dimensional confocal microscope system that corrects variance in brightness of an image due to the depth of a sample and realizes uniform brightness of the image with respect to the direction of depth.

BRIEF DESCRIPTION OF THE DRAWINGS

FIGS. 6A and 6B are explanatory views for explaining the relation between depth of a sample and brightness.

DETAILED DESCRIPTION OF THE PREFERRED EMBODIMENTS

Hereinafter, this invention will be described in detail with reference to the drawings.

Figure 1:
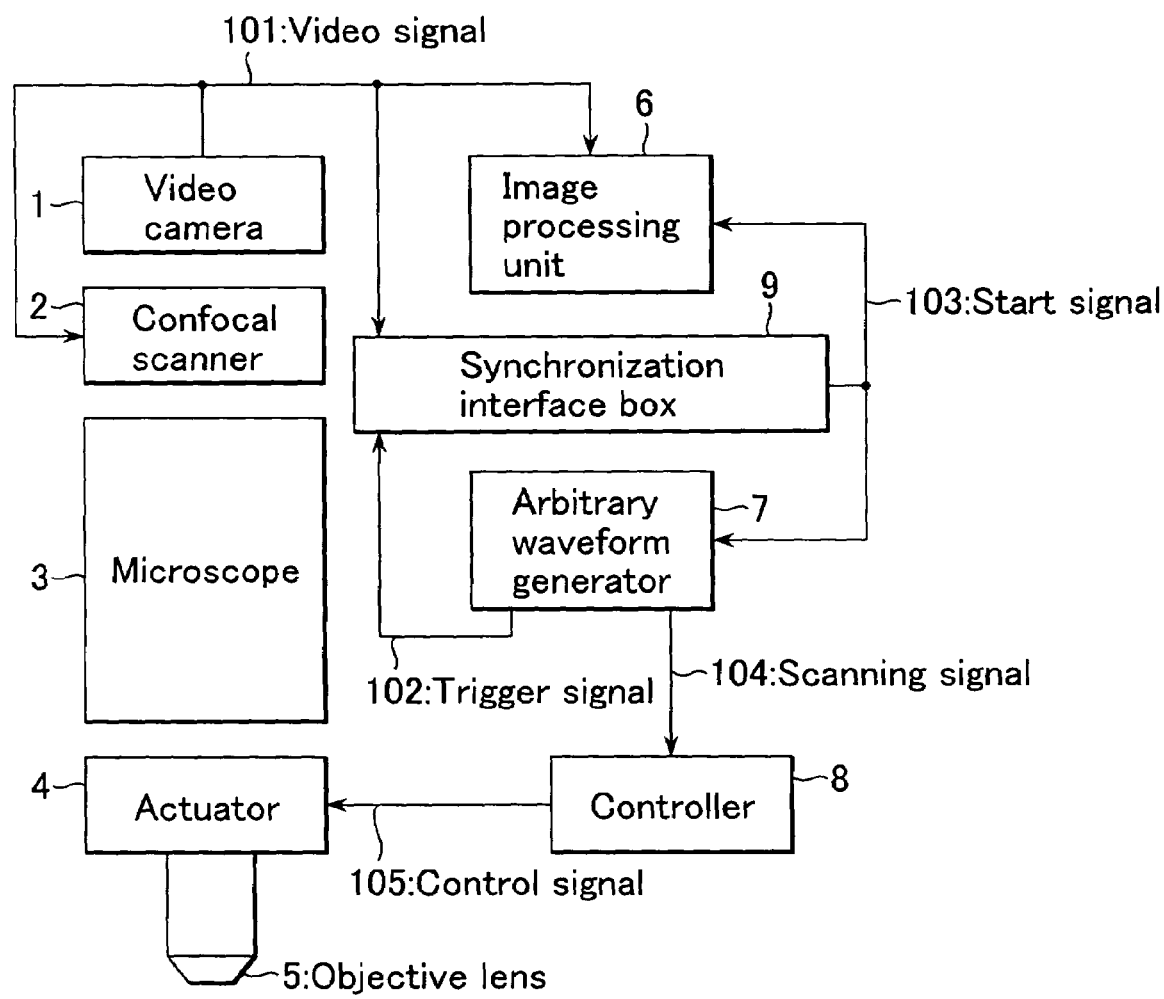
FIG. 1 is a structural view showing an example of conventional confocal microscope.
Figure 2:
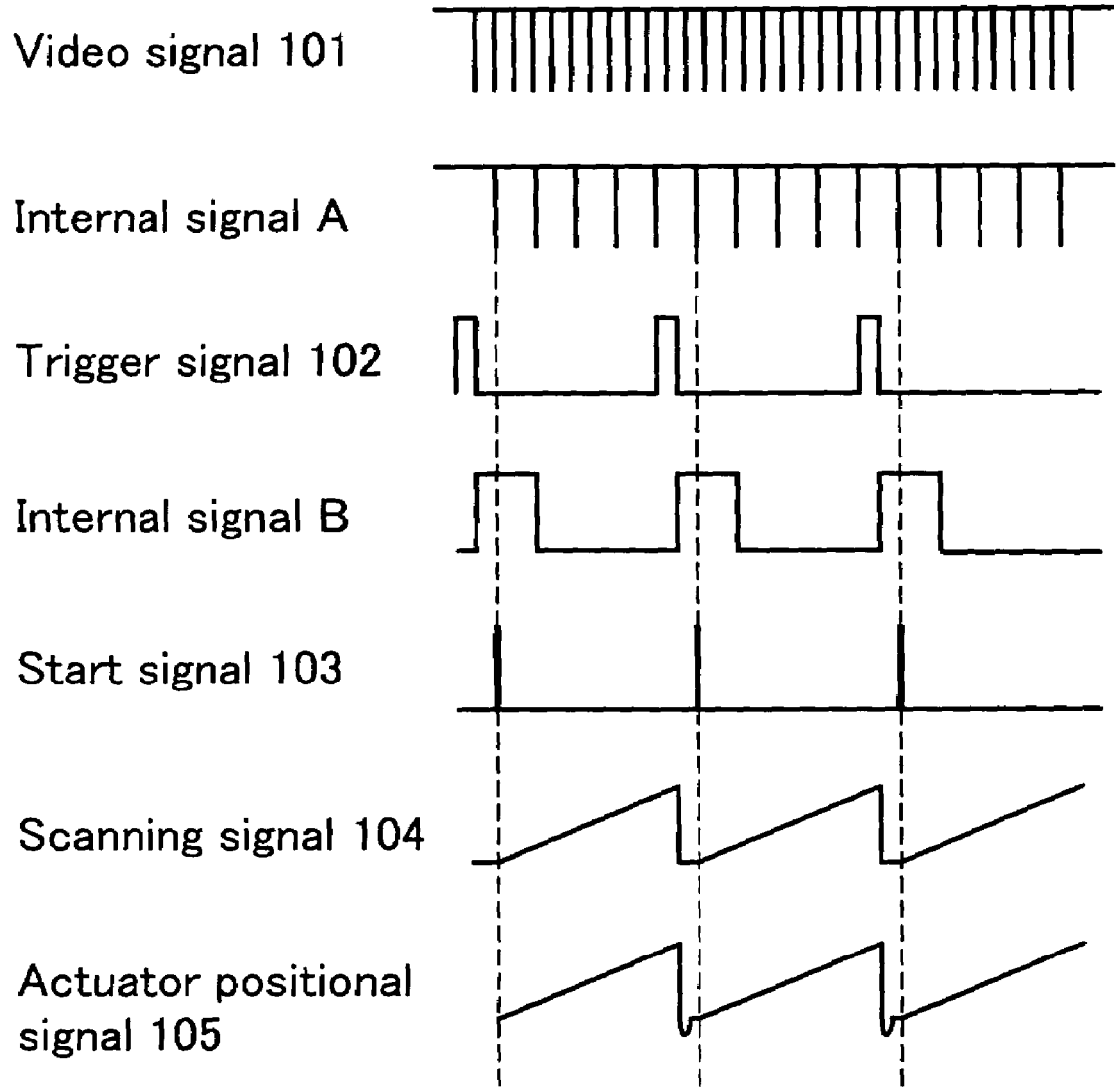
FIG. 2 is a timing chart of various signals handled by the confocal microscope shown in FIG. 1.
Figure 3A:
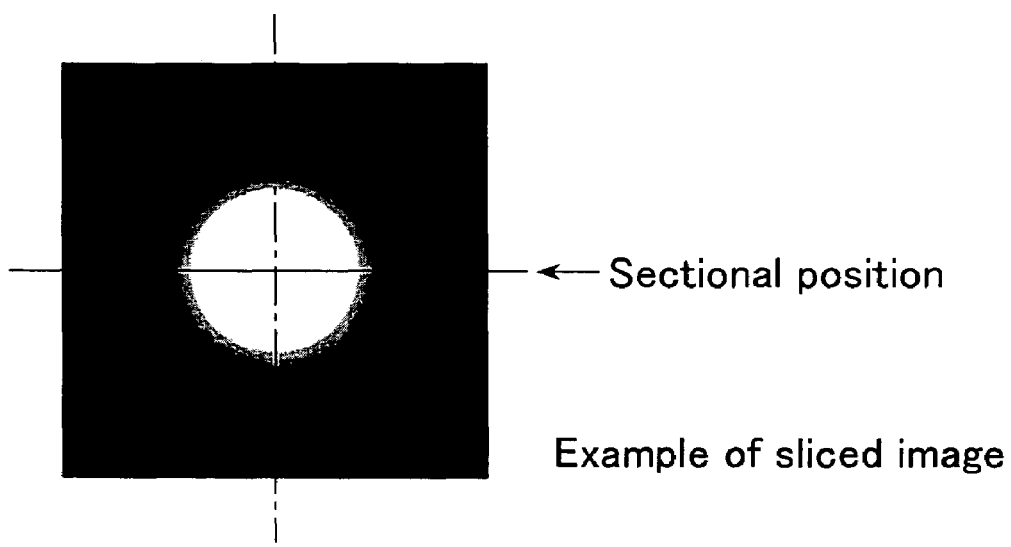
FIGS. 3A and 3B are explanatory views for explaining shading.
Figure 3B:
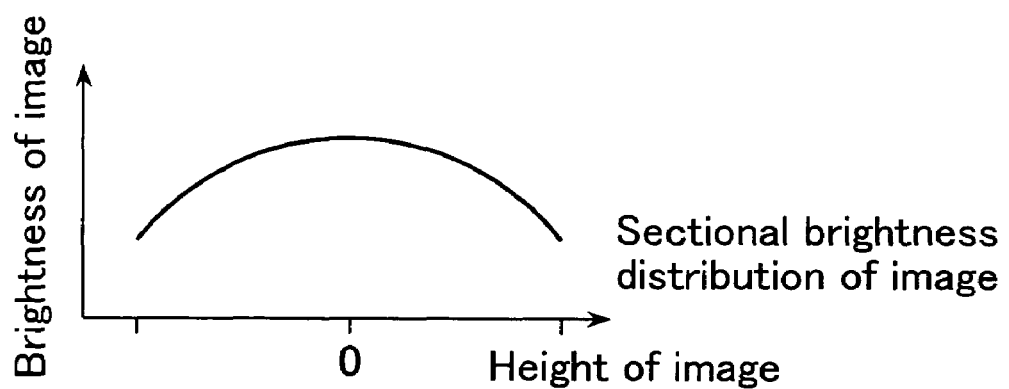
Figure 4A:
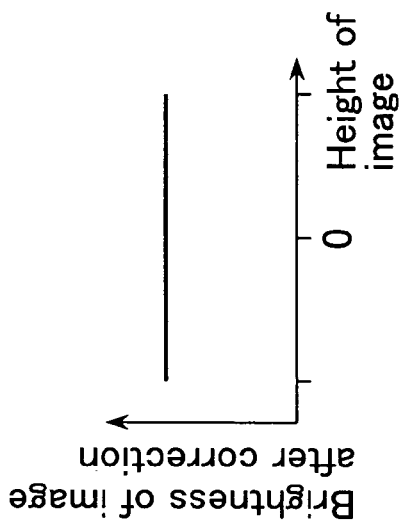
FIGS. 4A to 4C are explanatory views for explaining shading correction processing.
Figure 4B:
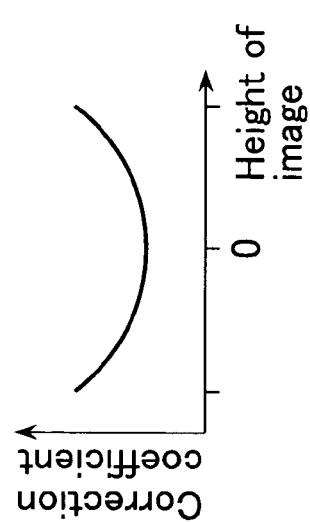
Figure 4C:
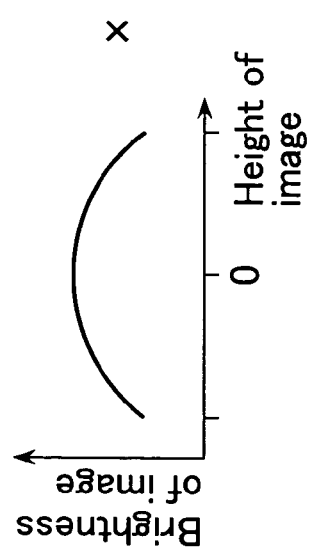
Figure 5:
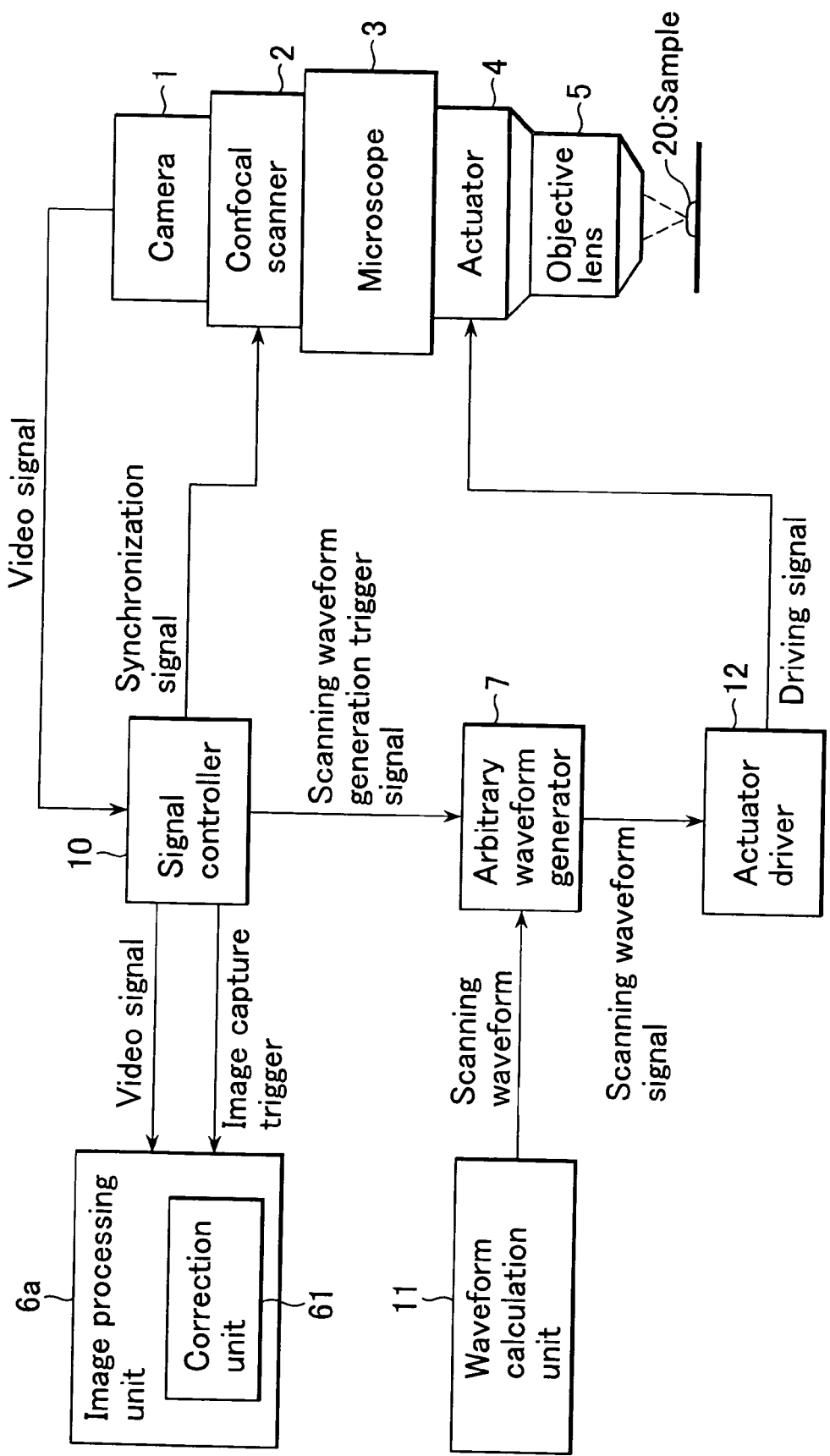
FIG. 5 is a structural view showing an embodiment of a three-dimensional confocal microscope system according to this invention.

FIG. 5 is a structural view showing an embodiment of a three-dimensional confocal microscope system. In FIG. 5, parts equivalent to those in FIG. 1 are denoted by the same numerals and will not be described further in detail.

In FIG. 5, numeral 10 denotes a signal controller, numeral 11 denotes a waveform calculation unit, numeral 12 denotes an actuator driver, and numeral 20 denotes a sample.

The signal controller 10 receives a video signal outputted from a video camera (hereinafter simply referred to as camera) 1, then outputs the video signal as it is, and also extracts a vertical synchronization signal from the video signal and generates various trigger signals based on the vertical synchronization signal.

An arbitrary waveform generator 7, upon receiving a scanning waveform generation trigger signal from the signal controller 10, generates a scanning waveform, which has been sent in advance from the waveform calculation unit 11 and stored, and sends the scanning waveform to the actuator driver 12.

The waveform calculation unit 11 calculates a triangular wave (waveform that linearly increases and then returns to its original level) or a step wave (waveform that increases stepwise and then returns to its original level) from the scanning period and the scanning distance in the direction of optical axis of an objective lens 5 when the sample 20 is observed. The waveform calculation unit 11 then outputs the wave as a scanning waveform to the arbitrary waveform generator 7.

The actuator driver 12 generates a driving signal for driving an actuator 4 on the basis of the scanning waveform signal outputted from the arbitrary waveform generator 7.

The details of the operation will now be described.

When a video signal (including a vertical synchronization signal) is sent from the camera 1 to the signal controller 10, the signal controller 10 sends the video signal as it is to an image processing unit 6a. At the same time, the signal controller 10 extracts the vertical synchronization signal from the video signal, then sends the synchronization signal to a confocal scanner 2, and generates various trigger signals, that is, a scanning waveform generation trigger signal and an image capture trigger signal.

The signal controller 10, upon receiving an image capture start signal, sends the first vertical synchronization signal encountered after the image capture start signal has fallen to a low level to the arbitrary waveform generator 7 as the scanning waveform generation trigger signal, and also sends the vertical synchronization signal to the image processing unit 6a as the image capture trigger signal. The image capture start signal is a signal that an operator inputs to the signal controller at arbitrary timing from a higher-order controller, for example, a personal computer (hereinafter referred to as PC). The pulse width of the image capture start signal is twice or more as wide as the period of the vertical synchronization signal of the video signal.

The arbitrary waveform generator 7, upon receiving the scanning waveform generation trigger signal from the signal controller 10, generates the scanning waveform, which has been inputted from the waveform calculation unit 11 and stored in advance, and sends the waveform to the actuator driver 12.

The actuator 4 is driven by a driving signal from the actuator driver 12 and moves the objective lens 5 in the direction of optical axis for scanning in accordance with the scanning waveform. The image processing unit 6a acquires sliced images of the sample 20 in synchronization with this scanning.

The image processing unit 6a and the waveform calculation unit 11 are constituted by, for example, a PC.

In this invention, a correction unit 61 for correcting brightness in the depth of a sample is added to the image processing unit 6a. This will be described now.

A fluorescent bead is used as a reference sample and plural confocal sliced images of it at different depths are picked up in advance. Then, the relation between the depth of the sample and the brightness of the image is found. The brightness may be an average value or maximum value of light intensity in an image area where fluorescent light is emitted.

From the relation between the depth of the sample and the brightness of the image thus found, a correction function for a brightness correction coefficient using the depth of the sample as a variable is prepared. The correction function is equivalent to the reciprocal of the relation between the depth of the sample and the brightness. As the correction coefficient is calculated from this correction function and is multiplied by the brightness of the actual sliced images, the brightness is corrected to constant brightness.

FIGS. 6A and 6B are explanatory views for explaining the relation between the depth of the sample and the brightness.

In FIG. 6A, a fluorescent bead 21 is immersed in a culture 24 between a glass base 22 and a cover glass 23. The sample constituted in this manner is irradiated with excited light 25 (indicated by bold arrows) by the confocal microscope (not shown). As this excited light 25 is cast onto the fluorescent bead 21, fluorescent light 26 (indicated by thin arrows) is generated form the fluorescent bead 21 and its image is picked up by the camera attached to the confocal microscope. The fluorescent bead 21 is a highly precise sphere with a diameter of several ten nanometers to several hundred micrometers. Since the brightness (intensity of image pickup signal) of a sliced image of the fluorescent bead 21 may be regarded as inherently uniform at any point, this brightness data can be used as a reference.

FIG. 6B shows the relation between the depth of the fluorescent bead 21 and the brightness of the fluorescent light 26 emitted from the fluorescent bead 21. In FIG. 6B, the values at points A to F represent the brightness of the sliced image of the fluorescent bead 21 at various depths. Using this data, the relation between the depth within the image pickup range (between the cover glass 23 and the glass base 22) and the brightness is found.

Specifically, in order to perform interpolation and extrapolation of the brightness data of the sliced image with respect to the depth data of the fluorescent bead 21, for example, an approximate formula based on exponential function is found and the approximate formula is normalized. Here, normalization means that the brightness of other sliced images is expressed in accordance with a ratio to the value of the brightness of an image of the sample at the smallest depth (the brightest sliced image), where this value is 1.

From the relation between the depth of the sample and the brightness thus found, the correction function for calculating the brightness correction coefficient is prepared using the depth of the sample as a variable. This correction function may be the reciprocal of the above-described approximate formula.

Figure 7C:
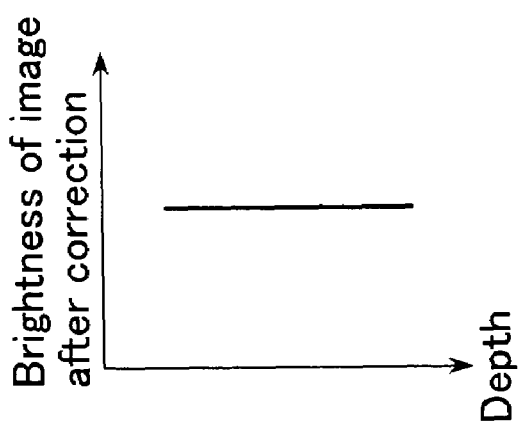
FIGS. 7A to 7C are explanatory views for explaining the relation between a function of depth of a sample and brightness, and a correction function.
Figure 7B:
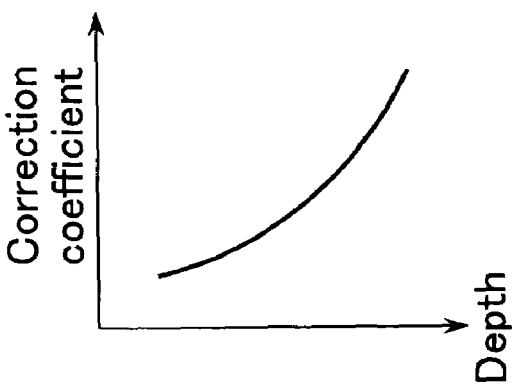
Figure 7A:
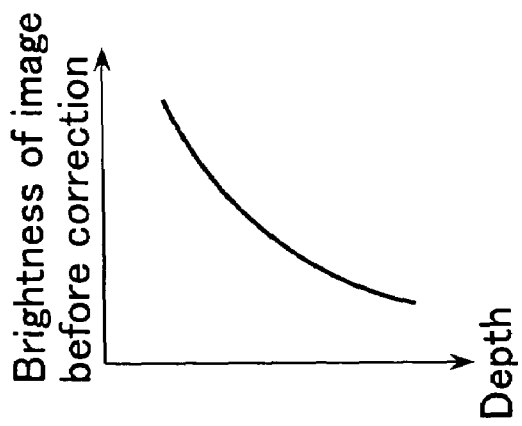

FIGS. 7A to 7C are explanatory views for explaining the relation between the function of the depth of the sample and the brightness, and the correction function.

FIG. 7A is a graph showing the function of the depth of the sample and the brightness similar to the above-described function shown in FIG. 6B. FIG. 7B is a graph showing the correction function representing the relation between the depth of the sample and the correction coefficient. FIG. 7C is a graph showing the relation between the depth of the sample and the brightness after correction.

In short, as the brightness at a predetermined depth shown in FIG. 7A is multiplied by the correction coefficient at the predetermined depth found from the function shown in FIG. 7B, the brightness with respect to the depth of the sample after correction becomes constant, as shown in FIG. 7C.

Therefore, sliced images having uniform brightness at any point in the direction of depth of the sample can be acquired and a three-dimensional image having brightness close to the original brightness of the sample can be provided. Moreover, since brightness affects recognition of color, the correction of the brightness enables accurate identification of the sample based on spectroscopy.

This invention is not limited to the above-described embodiment and includes various changes and modifications without departing from the scope of the invention.

As described above, according to this invention, it is possible to realize a three-dimensional confocal microscope system that corrects changes in brightness of an image due to the depth of a sample and causes the image to have uniform brightness at any point in the direction of depth.

In short, as brightness correction is performed, a three-dimensional image having brightness close to the original brightness of the sample is acquired. Also, since the influence of inaccurate brightness on identification of color can be eliminated, the sample can be identified accurately on the basis of spectroscopy.

Moreover, since a fluorescent bead is used as a reference sample, data on brightness with respect to the depth of the reference sample can be acquired.

What is claimed is:

1. A three-dimensional confocal microscope system for performing image processing based on image pickup data of a plurality of sliced images of a sample outputted from a confocal scanner and thus acquiring a three-dimensional image, of the sample, the system comprising a correction unit for correcting brightness of each of the sliced images on the basis of an entire depth of the samples, wherein the correction unit corrects the brightness of each of the sliced images on the basis of a correction function representing a relation between the entire depth of the sample and a correction coefficient for correcting the brightness of the sliced images, and wherein the correction function is a reciprocal of an exponential function representing a relation between the entire depth of a reference sample and brightness of each of the sliced images of the sample.

2. The three-dimensional confocal microscope system as claimed in claim 1, wherein the reference sample is a fluorescent bead.

* * * * *